United States Patent [19]

Okamoto et al.

[11] 4,452,861
[45] Jun. 5, 1984

[54] SOLID PARTICLES ENCAPSULATED WITH CYANOACRYLATE POLYMER

[75] Inventors: Fumio Okamoto, Kamukura; Katsuhiro Kato, Tokyo, both of Japan

[73] Assignee: RCA Corporation, New York, N.Y.

[21] Appl. No.: 380,285

[22] Filed: May 20, 1982

[51] Int. Cl.$^3$ .......................... B32B 15/08; B05D 5/06
[52] U.S. Cl. ................... 428/402.24; 428/328; 428/402; 428/522; 428/690; 428/907.7; 427/64; 427/68; 427/221
[58] Field of Search .................. 428/402, 402.24, 328, 428/522, 690

[56] References Cited

U.S. PATENT DOCUMENTS

| | | | |
|---|---|---|---|
| 2,908,588 | 10/1959 | Harper | 428/402 X |
| 3,494,912 | 2/1970 | Toyama et al. | 428/402 X |
| 4,329,332 | 5/1982 | Couvreur et al. | 428/402 X |

OTHER PUBLICATIONS

A. T. Florence, T. L. Whateley, and D. A. Wood, "Potentially Biodegradable Microcapsules with Poly (Alkyl 2-Cyanoacrylate) membranes," J. Pharm. Pharmacol., 31, 422–424 (1979).

*Primary Examiner*—P. C. Ives
*Attorney, Agent, or Firm*—E. M. Whitacre; D. H. Irlbeck; L. Greenspan

[57] ABSTRACT

Article of manufacture comprises a solid core particle individually encapsulated with a film consisting essentially of alkyl 2-cyanoacrylate polymeric material. The film may be produced in situ by agitating a mixture of core particles having adsorbed water on the surfaces thereof in a nonaqueous liquid containing dissolved alkyl 2-cyanoacrylate monomer, whereby the monomer and adsorbed water react and deposit the film on the surfaces of the particles.

4 Claims, 2 Drawing Figures

SOLID PARTICLES ENCAPSULATED WITH CYANOACRYLATE POLYMER

BACKGROUND OF THE INVENTION

This invention relates to core particles that are individually encapsulated with cyanoacrylate polymeric films and to methods for preparing such encapsulated core particles. The films are relatively impervious and can protect the core particles from degradation by reactive or corrosive surroundings.

Various procedures and specific polymeric materials have been proposed for encapsulating minute core particles, which may be either solid or liquid. In most applications, the encapsulated core particles are subjected to environments which are not particularly severe, and so there are many choices of encapsulating materials and of methods of preparation.

In some methods for preparing viewing screens for cathode-ray tubes, a slurry of phosphor particles in water is coated on a glass panel and dried. The dried coating is subjected to several processing steps, and then substantially all organic material present must be removed. Many phosphors with desirable luminescent properties cannot be used in these methods because they deteriorate during these steps, particularly while they are in an aqueous slurry. The encapsulating material of the novel article can protect the phosphor particles from substantial deterioration in an aqueous slurry and also during the subsequent processing steps. Also, the encapsulating material of the novel article can be substantially completely removed by heating in air in a temperature range ordinarily used for this purpose, which is about 250° to 450° C., without adversely affecting the luminescent properties of a deposited layer of the particles.

SUMMARY OF THE INVENTION

The novel article of manufacture comprises solid core particles each encapsulated with a film coating consisting essentially of alkyl cyanoacrylate polymer. The coating is preferably produced by in situ polymerization of at least one alkyl 2-cyanoacrylate monomer on the particle surfaces. The novel method comprises agitating a mixture of core particles having water adsorbed on the surfaces thereof in a nonaqueous liquid containing dissolved alkyl 2-cyanoacrylate monomer and, optionally a small amount of dissolved water. The monomer and adsorbed water react and deposit polymeric material as an encapsulating film on the surfaces of the core particles. The novel method may be repeated many times in order to increase the thicknesses of the films.

DETAILED DESCRIPTION OF THE PREFERRED EMBODIMENTS

Figure 1:
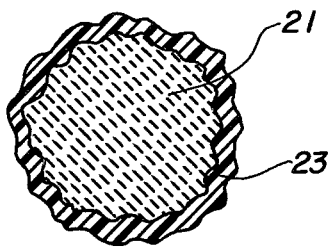
FIG. 1 is a cross-sectional view of an embodiment of the novel article.

Alkyl 2-cyanoacrylate monomer is known to polymerize by the catalytic action of water. In the novel method, tiny solid core particles dispersed in a liquid are mixed with alkyl 2-cyanoacrylate monomer which may be diluted by a solvent. The polymerization of monomer occurs in situ on the surface of the suspended core particles due to the catalytic action of a trace of water adsorbed on the particle surfaces, and thus the particles are coated with the polymer films. At the end of the reaction, the capsuled particles are washed with an inert liquid and dried. The following examples are based on this procedure.

EXAMPLE 1

(1) Disperse by agitation 2 grams of CaS:Ce (cerium-activated calcium sulfide) phosphor powder in about 3 ml. of dried ethyl ether in a 200-ml. beaker. This phosphor has an average particle size of about 15 microns. (2) Add to the dispersion 2 ml. of water-saturated ethyl ether having dissolved therein about 70 mg. of ethyl 2-cyanoacrylate monomer. (3) While agitating the dispersion, evaporate ethyl ether until the dispersion becomes a thick slurry. (4) Just before all of the ethyl ether evaporates, repeat steps (2), (3), and (4). After step (4) has been repeated five times, (5) add 2 ml. of dried ethyl ether, wash the coated particles in the added ethyl ether, decant the supernatent ethyl ether and then dry the coated particles. The product is core phosphor particles, each encapsulated in a film coating of poly[ethyl 2-cyanoacrylate] (ethyl cyanoacrylate polymer) that is estimated to be about 0.7 $\mu$m (micrometer) thick.

EXAMPLE 2

A portion of the product of Example 1 is subjected to another coating process the same as described in Example 1. This increases the thickness of the coatings on core phosphor particles.

In this example, a total of 0.7 gram of monomer was used for 2 grams of core particles. Upon baking the sample in air as described below, the weight loss of the coated particles was about 25.3%, which means nearly all of the introduced monomer was used for forming the polymer coatings. For a fixed weight ratio of polymer coating to the core particles, coating thickness depends upon core size because the specific surface area is a function of core size. From this weight loss value, the coating thickness is estimated to be about 1.4 $\mu$m assuming that the core particles have a spherical shape with an average particle diameter of 15 $\mu$m and that the specific gravity of the polymer is 1.25 g/cm$^3$.

The water stability of the coated phosphor particles was measured by the conductance change of the water in which a fixed amount of phosphors is suspended. The measurement showed about 2 to 3% dissolution after 4 hrs.' immersion in water. The dissolution rate is approximately three orders of magnitude less than that of uncoated phosphor.

EXAMPLE 3

Follow the procedure described in Example 2 except use a one-liter beaker and three times the amounts of each of the ingredients used. The product is similar to the product of Example 2.

EXAMPLE 4

Follow the procedure described in Example 2 except use a mixture of 75-weight-percent ethyl cyanoacrylate monomer and 25-weight-percent isobutyl 2-cyanoacrylate monomer for the monomer. The product is similar to the product of Example 2 except that the coating is an ethyl-isobutyl copolymer.

EXAMPLE 5

Following the procedure described in Example 2 except use a mixture of 75-weight-percent ethyl 2-cyanoacrylate and 25-weight-percent special alkyl 2-cyanoacrylate (Aron Alpha #801, special grade) for the monomer. The product is similar to the product of Example 2 except that the coating is a cyanoacrylate copolymer.

GENERAL CONSIDERATIONS AND ALTERNATIVES

The novel method can be used to coat or encapsulate a wide variety of particles. In principle, particles of nonaqueous liquid can be encapsulated after emulsification. Any solid particle can be coated or encapsulated by the novel method provided there is a suitable nonaqueous solvent that can be used as described below.

FIG. 1 illustrates a typical novel article of the invention. It comprises a solid core particle 21 encapsulated in a film or coating 23 of alkyl 2-cyanoacrylate polymer. The polymeric film 23 was produced in situ according to the novel method.

Encapsulated particles have a wide variety of uses. Our primary objective is to encapsulate water-sensitive phosphor particles, such as CaS:Ce phosphor, so that they are substantially insensitive to water for a sufficient time period to permit economical fabrication of luminescent screens in a factory. Besides CaS:Ce (cerium-activated calcium sulfide phosphor), other water-sensitive phosphors that can be encapsulated by the novel method are CaS:Tb, CaS:Eu, SrS:Eu, SrS:Mn, SrS:Cu, (Ca,Sr)S:Eu and $Sr_2SiS_4$:Eu. Nonluminescent particles can also be encapsulated by the novel method. Generally, the particle sizes of the core particles can be in the range from submicron to about 100 microns (micrometers).

Only two kinds of chemicals are required in the novel method, and they are alkyl 2-cyanoacrylate monomer and a solvent for the monomer. Special hardener, initiator or catalyzer is not required because a trace of water acts to initiate, catalyze and harden the monomer on the surfaces of the particles.

Alkyl 2-cyanoacrylate monomers are available commercially under various trade names such as Instant Adhesive, Power Ace, Aron Alpha, etc. Aron Alpha monomers, marketed by Toa Gosei Kagaku Kogyo Co., Ltd., Tokyo, Japan are available in several forms, some of which are:

101—methyl 2-cyanoacrylate monomer
201—ethyl 2-cyanoacrylate monomer
Special Grade—isobutyl 2-cyanoacrylate monomer
801, Special Grade—alkyl 2-cyanoacrylate with alkyl chain longer than ethyl radical.

Other alkyl 2-cyanoacrylate monomers and other sources can be used. Among various alkyl esters, the ethyl ester, i.e., ethyl 2-cyanoacrylate, is most suited for the present purpose. Other alkyl esters such as methyl, propyl, and butyl esters can be added to the ethyl ester to modify the characteristics of the capsule wall.

The nonaqueous solvent should (a) be inactive to the core particles, (b) be a suitable medium in which to disperse the core particles, (c) dissolve the monomer but not the polymer, and (d) evaporate at a reasonable rate or at near room temperature. Ethyl ether, which can be dried by contact with anhydrous calcium chloride, is the preferred solvent, although other solvents can be used.

Although a trace of water is ordinarily adsorbed on the surfaces of the core particles, it is preferred to dissolve a small amount of water in the solvent to assure that there is sufficient water present to initiate and catalyze the polymerization reaction. Ethyl ether saturated with water at room temperature contains about 1.2% of water.

The novel method is carried out at room temperature by establishing an agitated liquid suspension of core particles in a liquid solvent having alkyl 2-cyanoacrylate dissolved therein and a trace of water dissolved in the solvent and/or adsorbed in the core particles. In either case, the water migrates to the surfaces of the core particles and catalysts the polymerization of the monomers on the surfaces of the particles. The suspension is free from water as a separate phase.

The method can be repeated one or more times to build up the thicknesses of the polymeric coatings on the core particles. Also, as exemplified in Example 2 above, after polymerization is completed, most of the solvent can be evaporated, and more monomer-bearing solvent can be added. This latter procedure can be repeated one or more times to increase the thicknesses of the polymer coatings on the core particles.

After completing the polymerization, the coated core particles are washed in a suitable solvent and dried in air. The dry product is a free-flowing powder having film coatings about 0.1 to 1.0 micrometer thick. The coatings protect the core particles from chemical attack by water and other reactive chemicals. The thicker the coatings, the greater the protection.

The coatings can be removed, and the core materials can be recovered by baking them in air or by dissolution in a neutral solvent, or possibly by biodegradation of the capsule walls. The core materials can also be released slowly through the capsule walls by permeation when the capsules are suspended in an appropriate solvent for core materials. Where the coated core particles have been incorporated into a structure, such as a luminescent viewing screen for a cathode-ray tube, the coatings can be removed without disrupting the screen by baking the structure at about 250° to 450° C., preferably at or above about 300° C., in air for about 15 to 60 minutes.

Our baking conditions for completely removing the film coatings are as follows: Spread the coated CaS:Ce phosphors into a layer on a pan and place the pan and layer in a furnace that is open to air. Raise the temperature of the furnace at a rate of about 5° to 10° C. per minute up to a desired temperature. Keep the layer at this temperature for a certain length of time, and then cool the layer of phosphor in the furnace. The optimum temperature and time depend on the manner of spreading of the phosphor powder on the pan. In our case, where fairly thick layers of phosphor are spread on a pan, baking at a temperature at or above 440° C. was required for the complete bake-out, although thermogravimetric analysis showed that the nearly complete baking was attained at about 250° C. If even a small amount of polymer is left unbaked (possibly carbonized), the luminescence efficiency of the phosphor is greatly reduced due to the discoloring of the phosphor powder.

Figure 2:
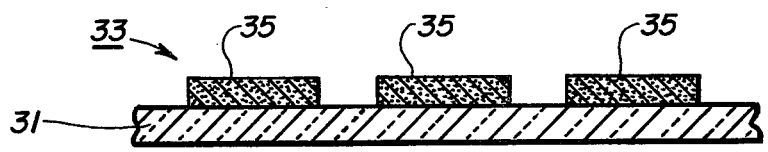
FIG. 2 is a sectional elevational view of a fragment of a viewing window of a cathode-ray tube and luminescent screen on the inner surface thereof.

A typical structure of the viewing window of a cathode-ray tube is shown in FIG. 2. A fragment of the glass window 31 carries a luminescent screen 33. The luminescent screen 33 comprises defined areal coatings 35, which are in the form of stripes in this example, but may be dots or other shapes, comprised of phosphor particles several particle layers thick. The defined areal coatings may be deposited by known methods, such as the slurry-direct method, or by the settling method, which include dispersing the phosphor particles in aqueous media. Also, the coated particles can be deposited by the phototacky method. The phosphor particles are encapsulated according to the invention to protect them from degradation by the action of moisture and water. After the screen is deposited and some subsequent processing completed, the encapsulating coatings are substantially completely removed by baking in air as described above. Where the particles are encapsulated according to Example 2 above, the screen is baked in air at about 250° to 450° C. for about 15 to 60 minutes.

What is claimed is:

1. An article of manufacture comprising solid core particles of water-sensitive inorganic phosphor, each particle being separately encapsulated with a film coating consisting essentially of alkyl 2-cyanoacrylate polymer, said film coatings providing said particles with substantial protection from deterioration when they are present in an aqueous slurry.

2. The article of manufacture defined in claim 1 wherein said films have been polymerized in situ.

3. The article of manufacture defined in claim 1 wherein said films consist essentially of poly(ethyl 2-cyanoacrylate).

4. The article of manufacture defined in claim 1 wherein said core particles are solid particles of luminescent material consisting essentially of activated host crystals selected from the group consisting of CaS, SrS and (Ca, Sr)S.

* * * * *